United States Patent [19]

Okada et al.

[11] 4,311,421
[45] Jan. 19, 1982

[54] FASTENER

[75] Inventors: Shigeo Okada, Yokohama; Katsuo Sato, Yokosuka, both of Japan

[73] Assignees: Kato Hatsujou Kabushiki Kaisha; Nissan Jidosha Kabushiki Kaisha, both of Kanagawa, Japan

[21] Appl. No.: 154,453

[22] Filed: May 29, 1980

[30] Foreign Application Priority Data

Jun. 12, 1979 [JP] Japan ............................ 54-80373[U]

[51] Int. Cl.³ .............................................. F16B 13/06
[52] U.S. Cl. .................................................... 411/59
[58] Field of Search .................. 411/59, 57, 71, 44, 411/42, 39, 15, 38, 34, 35, 36, 69, 182, 186, 187, 41, 907, 908, 427; 24/73 P, 73 PF, 73 PM, 217 R, 208 A

[56] References Cited

U.S. PATENT DOCUMENTS

| | | | |
|---|---|---|---|
| 633,537 | 9/1899 | Stewart | 411/34 X |
| 3,345,899 | 10/1967 | Fiddler | 24/73 PM |
| 3,358,551 | 12/1967 | Seckerson | 24/73 PF X |
| 3,417,438 | 12/1968 | Schuplin | 411/41 X |
| 3,522,756 | 8/1970 | Wolff | 411/71 |

*Primary Examiner*—Ramon S. Britts

[57] ABSTRACT

A fastener, comprising an expander part having a saucer-shaped head and a shank extending from the head and formed with a male thread thereon, and a fastener part having a flange and opposite stem portions branched from the back of the flange and connecting through hinge portions to guide portions which join each other at the other ends thereof, the expander part and fastener part each being made of a resin, the fastener part having a circular bore extending from the flange to the stem portions to permit the expander part to be inserted in and temporarily retained in the stem portions, the circular bore having therein opposite bulges positioned ahead of the hinge portions to spread the stem portions outward away from each other when the expander part is pushed.

4 Claims, 5 Drawing Figures

FASTENER

BACKGROUND OF THE INVENTION

1. Field of the Invention

The present invention relates to an expansible fastener adapted to be inserted in aligned holes in a plurality of panels for detachably securing them to each other with a force as large as would be provided by a screw.

2. Prior Art

Expansion type fasteners made of resinous materials for securing plural panels are disclosed in U.S. Pat. Nos. 3,112,547 and 3,918,130. Each of these known fasteners comprises an expansible fastener part having a leg and an expander part complementary to each other. After the leg of the fastener part has been positioned in aligned holes of panels, the expander part is pushed into the fastener part to spread the leg of the latter outward for thereby fastening the panels rigidly together.

The fastener shown in U.S. Pat. No. 3,112,547 includes a fastener part whose leg terminates at multiple fingers spaced apart from each other on its end which is to confront a panel surface. A drawback brought about here is that the split end of the leg is liable to get caught partly by a panel surface adjacent to a hole during insertion of the fastener part into the hole due to an irregular distribtion of hole diameters or the like. The result is a poor operationability and this is particularly pronounced when diameters of holes in panels are relatively small. The fastener when removed from panels can not elastically regain its fully unstressed position so that reuse of the fastener is impossible without experiencing a far poorer operationability.

Two different types of expansible fasteners are proposed in U.S. Pat. No. 3,918,130. A first type of fastener has a leg of its fastener part made up of two independent complementary members which are shaped on their inner walls to interlock with an outer periphery of an expander part in a specific manner. After insertion of the fastener part in aligned holes in panels, the fastener part and expander part are secured to each other while fastening the panels together. The bisected fastener part, however, increases time and labor necessary for the assemblage of the fastener while interlocking of the fastener and expander parts is permitted only in a particular orientation alone. The expander part can not be inserted in the fastener part unless after positioning the latter in holes of panels, resulting in a farther fall of the operationability. A second type of fastener has a fastener part whose legs are separate at their upper ends but integral with each other at the lower ends. Such a configuration of fastener parts avoids the inconvenience discussed in connection with the fastener of U.S. Pat. No. 3,112,547. Nevertheless, the operationability is not fully acceptable because the bifurcated end of the fastener part does not permit the expander part to be coupled with the fastener part until after the insertion of the fastener part in holes in panels.

SUMMARY OF THE INVENTION

Accordingly, the general object of the present invention is to provide an expansible fastener which promotes efficient operation.

Another object of the present invention is to provide an expansible fastener capable of securing plural panels together despite possible misalignment of the holes in the panels.

BRIEF DESCRIPTION OF THE DRAWINGS

The above-mentioned features and objects of the present invention will become more apparent with reference to the following description taken in conjunction with the accompanying drawings, wherein like reference numerals denote like elements and in which.

DETAILED DESCRIPTION OF THE INVENTION

Figure 1:
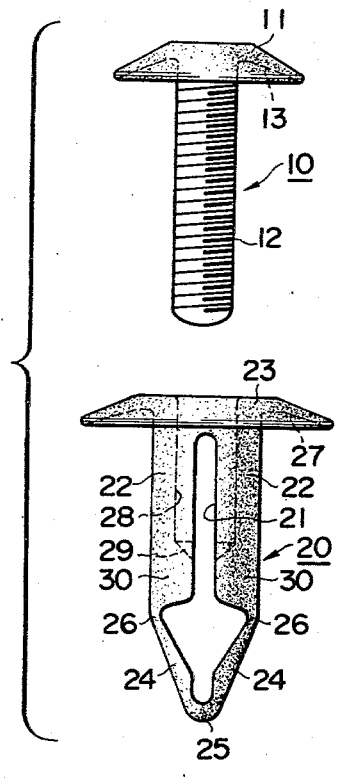
FIG. 1 is a front view of an expansible fastener according to the present invention.

Referring to the drawings and particularly, to FIG. 1, an expansible fastener embodying the present invention comprises an expander plunger 10 serving as an expander part and an expansible grommet 20 as a fastener part. The plunger and grommet are commonly in the form of molds of a resinous material. The plunger 10 has a saucer-shaped head 11 and a shank 12 extending from a central area of the back of the head 11 and is threaded axially from the top to the bottom. The head 11 has its thickenss reduced progressively toward the outermost circumferential end as at 13, so as to be elastically deformable into intimate contact with a flange 23 of the grommet 20.

Figure 2:
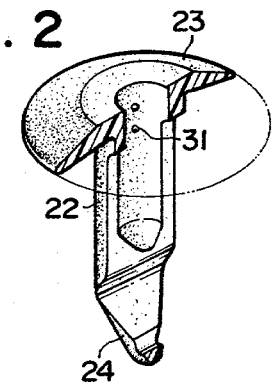
FIG. 2 is a fragmentary sectional perspective view of a grommet included in the fastener of FIG. 1.

The grommet 20 has a flange 23 and a leg (no numeral) extending from the back of the flange 23. The leg includes opposite stem portions 22 integral with each other at an opposite end of the leg and branched off from each other by opposite axial slots 21. The stem portions 22 connect to turned-in or guide portions 24 which converge to and join each other at an extreme end 25. A hinge portion 26 intervenes between each stem portion 22 and its associated guide portion 24 so that the guide portion 24 is capable of ready elastic deformation when the corresponding stem portion 22 is urged outwardly from the other stem portion. The flange 23 has a diameter generally larger than that of the head 11 of the plunger 10 while its thickness is reduced progressively toward the outmost end as at 27 to permit intimate contact of the flange with a panel surface. A circular bore 28 extends from the top of the flange 23 down to a level short of the hinge portions 26 through the opposite stem portions 22. The inside diameter of the circular bore 28 is substantially equal to the outside diameter of the shank 12 of the plunger 10. Bulges 30 intervene between the bottom 29 of the bore 28 and opposite hinge portions 26 such that they urge the lower ends of the stem portions 22 outwardly away from each other when the plunger 10 inserted in the grommet 20 is pushed downward beyond the bottom 29 of the bore 28. As viewed in FIG. 2, one or two small lugs 31 are positioned on the wall of the bore 28.

Figure 3:
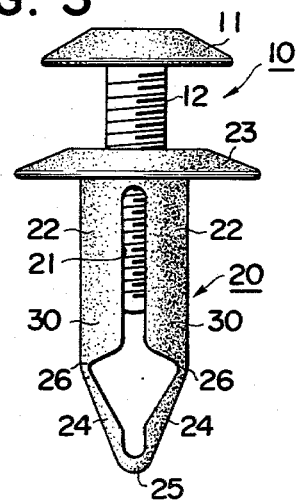
FIG. 3 shows in front elevation the fastener having an expander plunger temporarily retained by the grommet.

The plunger 10 of the fastener thus described has its threaded shank 12 inserted in the circular bore 28 of the grommet 20 as shown in FIG. 3, whereby the lug or lugs 31 on the grommet are caught in the thread grooves of the shank 12. The plunger and grommet now integral with each other are prevented from separation even during transfer from one position to another before use. In this situation, the outside diameter of the leg of the grommet 20 defined by the stems 22 remains unchanged.

Then the fastener having the temporarily assembled plunger and grommet is inserted in aligned holes 41 and 51 of panels 40 and 50 until its end 25 and stem portions 22 protrude from the lower panel 50. It will be noted that the guide portions 24 of the grommet joining each other at the end 25 promotes smooth insertion of the fastener even if the holes 41 and 51 in the overlayed panels are out of alignment. This will prove particularly effective in the case of quantity production. As the upper end of the stem portions 22 reach the hole 41 in the panel 40, the flange 23 of the grommet is brought into tight engagement with an edge of the panel 40 surrounding the hole 41 causing its thinner portion 27 to elastically deform for water-proofing.

Figure 4:
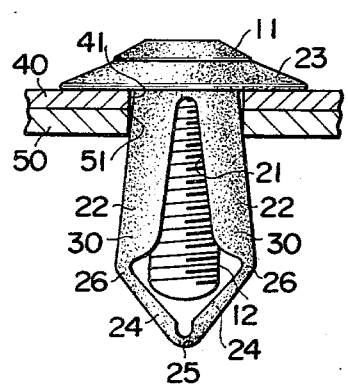
FIG. 4 is a front elevational view of the plunger pushed into the grommet to secure plural panels.
Figure 5:
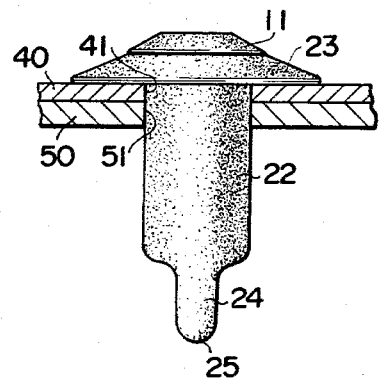
FIG. 5 is a side elevational view of the plunger and grommet shown in FIG. 4.

Thereafter, the plunger 10 is further pressed into the grommet 20 to a position illustrated in FIGS. 4 and 5. Then the plunger 10 pushes the bottom 29 of the bore 28 to thereby urge the bulges 30 outward away from each other. This in turn causes the stem portions 22 to open automatically into firm engagement with the walls of the holes. Formed of a resin, the threaded shank 12 of the plunger does not cut into the grommet 20, but still firmly interlocks with the latter due to the resistance afforded by the screw-thread. Meanwhile, the concave bottom of the head 11 intimately engages with the convex top of the flange 23 adding to the liquid-tightness of the fastener. Where it is desired to secure multiple panels simutaneously together, the stem portions 22 of the fastener can sufficiently engage with them due to their smooth outer contours. The fastener in rigid engagement with panels can be removed therefrom for re-use merely by turning the plunger 10 with a screwdriver.

It will be appreciated from the foregoing that an expansible fastener, according to the present invention, can have its fastener part received smoothly in holes in plural panels though the holes may have been misaligned, because turned in portions of the fastener part guide the insertion into the holes. It will also be appreciated that at least one lug provided to the fastener part temporarily locks an expander part in position therewith and, thus, prevents it from being separated during transportation. Stated another way, the expansible fastener of the present invention enhances efficiency of securing work.

We claim:
1. A fastener comprising:
   an expander part comprising:
      a saucer-shaped head; and
      a shank extending from said head and formed with a male thread thereon; and
   a fastener part comprising:
      a flange and opposite stem portions diversing from a position of said fastener part adjacent to a back of said flange and connecting through hing portions to guide portions which join each other at the other ends thereof;
      a circular bore extending from the flange to the stem portions to permit said extending part to be inserted therein;
      opposite bulges positioned at the bottom of said bore to spread said stem portions outward away from each other when said expanded part is pushed into said bore and into engagement with said opposite bulges; and
      at least one small lug provided on a wall of said bore for engagement with said male thread for temporarily holding said expanded part and said fastener part together until said expanded part is pushed into said bore to spread said stem portions whereby said expanded part and said fastener part are prevented from being separated during handling and transportation.

2. A fastener as claimed in claim 1, wherein said head of said expander part has a thickness thereof which is progressively reduced toward the circumferential edge.

3. A fastener as claimed in claim 1, wherein said flange of said fastener part is larger in diameter than said head of said expander part and has a thickness progressively decreasing toward the circumferential edge.

4. A fastener as claimed in claim 1, wherein said expander part and said fastener part are made of plastic resin.

* * * * *